United States Patent
Hansen

[19]

[11] Patent Number: 6,032,883

[45] Date of Patent: *Mar. 7, 2000

[54] APPARATUS AND METHOD FOR COMMINUTING GLASS FIBERS

[75] Inventor: Richard W. Hansen, Eagle, Id.

[73] Assignee: R&J Hansen, L.L.C., Salt Lake City, Utah

[*] Notice: This patent is subject to a terminal disclaimer.

[21] Appl. No.: 09/280,912

[22] Filed: Mar. 29, 1999

Related U.S. Application Data

[63] Continuation-in-part of application No. 09/092,499, Jun. 5, 1998, Pat. No. 5,887,804
[60] Provisional application No. 60/048,648, Jun. 5, 1997.
[51] Int. Cl.[7] .......................... B02C 19/00; B02C 19/14
[52] U.S. Cl. .................... 241/24.3; 241/27; 241/79.1; 241/99; 241/102; 241/193
[58] Field of Search ............................. 241/24.3, 27, 36, 241/79.1, 99, 102, 193, 300

[56] References Cited

U.S. PATENT DOCUMENTS

| | | |
|---|---|---|
| 1,169,907 | 2/1916 | App . |
| 3,342,426 | 9/1967 | Sackett, Sr. .............................. 241/189 |
| 3,993,256 | 11/1976 | Brewer ................................. 241/186.5 |
| 4,795,103 | 1/1989 | Lech ........................................ 241/77 |
| 5,184,781 | 2/1993 | Andela ...................................... 241/62 |
| 5,255,869 | 10/1993 | Smith .................................... 241/189.1 |
| 5,505,390 | 4/1996 | Rodgers ..................................... 241/48 |
| 5,628,467 | 5/1997 | Graveman ............................... 241/88.4 |
| 5,639,032 | 6/1997 | Roessler .................................... 241/33 |
| 5,775,604 | 7/1998 | Sato ..................................... 241/24.22 |
| 5,887,804 | 3/1999 | Hansen .................................. 241/24.3 |

*Primary Examiner*—John M. Husar
*Attorney, Agent, or Firm*—Madson & Metcalf

[57] ABSTRACT

An apparatus for comminuting glass fibers is disclosed. Within a housing are a plurality of weighted members or hammers, flexibly connected to and spaced about a rotatable shaft. A drive member rotates the hammers about the shaft to define a rotation circumference. A glass intake opening located at the top portion of the housing is provided to introduce glass fibers and carrier material into the apparatus. A first adjustable plate is located adjacent the glass intake opening and positioned to provide a space between the first adjustable plate and the hammers' rotation circumference. A first glass suspension chamber is defined by the glass intake opening, the first adjustable plate, and the rotation circumference of the hammers. In operation, a quantity of glass fibers and carrier material is introduced into the apparatus, and spinning weighted members contact the glass, causing the glass to strike the first adjustable plate and other glass particles. Adjusting the space between the first adjustable plate the weighted members' rotation circumference helps control the resulting particle size of the comminuted glass. Controlling the shaft rotation speed affects the resulting particle size of the comminuted glass.

20 Claims, 4 Drawing Sheets

APPARATUS AND METHOD FOR COMMINUTING GLASS FIBERS

RELATED PATENT APPLICATION

This invention is a continuation-in-part of U.S. patent application Ser. No. 09/092,499, filed Jun. 5, 1998, entitled "Apparatus for Comminuting Glass," now U.S. Pat. No. 5,887,804 which claims priority to U.S. Provisional Patent Application Ser. No. 60/048,648, filed Jun. 5, 1997, entitled "Apparatus for Comminuting Glass," which applications are incorporated herein by reference.

FIELD OF THE INVENTION

The present invention relates to an apparatus and method for safely comminuting glass fibers and fine glass particles to produce comminuted glass fibers, particles and powder having non-uniform, rounded edges. Advantageously, non-respiratory glass fibers are comminuted with little or no respiratory fibers being produced according to the present invention. In addition, the present invention generally converts respiratory fibers into a safe form.

TECHNICAL BACKGROUND

Because the raw materials from which glass is made are indigenous to most areas of the world and are generally inexpensive, glass has become an important material for a variety of applications. Even with the proliferation of plastics, glass continues to be the material of choice for use in making many types of containers and windows. Indeed, millions of tons of glass are produced annually.

Although the unique properties of glass render it suitable for use in a variety of applications, disposal of glass following its intended use presents some significant problems. Indeed, approximately eight percent of all municipal solid waste in the United States consists of glass. As environmental efforts to promote recycling increase, the amount of glass which is recovered from the solid waste stream will also continue to increase. In the United States alone, over one million tons of glass are recovered annually for recycling. One factor limiting the amount of recycling which is done is the lack of effective and convenient recycling opportunities in many areas.

The principal use of broken or refuse glass, generally called "cullet," is by glass container manufacturers. Cullet is generally understood to include ¼ inch to ½ inch glass particles. Although it is possible to manufacture some glass products using 50 percent cullet or more, most glass containers are manufactured using 20 to 30 percent cullet.

To meet strict manufacturing specifications, however, all cullet must be sorted by color, crushed to a size suitable for the furnace, and separated from bits of aluminum and other contaminants. These requirements, combined with the relative high cost of transporting cullet, make it difficult to produce high-quality cullet at a price which renders viable the recycling of glass.

Glass fiber, commonly used in insulation and similar products, is manufactured in a process which produces large quantities of glass fiber waste. When glass fiber waste is ground in conventional glass grinders, respiratory fibers are produced. Respiratory fibers are fine fibers having sharp, splintered ends which are inhaled into the lungs and which can harm the sensitive lung tissues. Long-term exposure to respiratory fibers can be extremely hazardous to ones health. Because of the risks associated with producing respiratory fibers, manufacturers of glass fiber dispose of the glass rather than grind and recycle it.

Because of the limited options for recycling glass, most scrap glass is disposed of merely by discarding it. As it becomes more difficult to utilize landfills as an alternative to recycling, increased emphasis has been placed on identifying effective and viable recycling options for glass.

Because no viable method of recycling glass presently exists, large quantities of waste glass, including glass fiber, are generated annually which contribute to the filling of landfills.

It would be an advancement in the art to provide an apparatus for recycling waste glass fibers which quickly and inexpensively converts the waste glass fiber into a form which can be safely handled.

It would be an advancement in the art if such apparatus could produce comminuted glass free from contaminants such as grinding compounds.

It will be appreciated that there is a need in the art for apparatus and methods for comminuting waste glass fibers, including respiratory fibers, into a useful fiber reinforcement material.

SUMMARY OF THE INVENTION

The present invention is directed to an apparatus for comminuting glass, including waste glass fibers. The apparatus includes a housing having a plurality of weighted members or hammers located therein. The weighted members are preferably flexibly connected to and spaced about a rotatable shaft. Chain links are a currently preferred mode of flexibly connecting the weighted members to the shaft. Flexible cables can also be used. A drive member, such as a variable speed motor, rotates the shaft, causing the weighted members to spin within the housing. The spinning weighted members or hammers define a rotation circumference.

Glass is introduced into the apparatus through a glass intake opening located at the top portion of the housing. A first adjustable plate is located adjacent the glass intake opening and positioned to provide a space between the first adjustable plate and the weighted members' rotation circumference. A first glass suspension chamber is defined by the glass intake opening, the first adjustable plate, and the rotation circumference of the hammers.

To comminute waste glass fibers, a carrier material is mixed with the glass fibers. The mixture is then introduced into the apparatus. Alternatively, the glass fibers and carrier material can be simultaneously introduced into the apparatus and mixed within the first glass suspension chamber. The carrier material provides mass to carry the waste glass fiber within the suspension chamber. The tumbling action of glass fibers with itself or with the carrier material removes fractured, sharp ends of the fibers.

Several possible carrier materials can be used. Powdered glass is one currently preferred carrier material. It has been found that even small amounts of glass powder mixed with the waste fiber is sufficient to carry the glass fiber within the apparatus. For instance, good results can be obtained with as little as 1 part glass powder to 10 parts glass fiber and even up to 40 parts glass fiber. Cullet is another currently preferred carrier material. The ratio of cullet to waste fiber preferably ranges from about 2:1 for very heavy cullet to about 1:40 for light cullet. Water is another carrier material that can be used.

Although the process of the present invention generally comminutes glass fibers without producing respiratory fibers, the quantity of respiratory fibers which may be produced are within an acceptable level. In addition, the process of the present invention generally converts respiratory fibers into a non-respiratory form acceptable for most applications. One currently preferred use of the comminuted glass fibers produced according to the present invention is as a strengthener or enhancer in molded plastics.

In operation, the shaft is rotated, causing the weighted members to spin about the shaft. The spinning weighted members contact glass fibers and carrier material introduced into the apparatus, causing the glass fibers to strike each other, the carrier material, and the first adjustable plate. Adjusting the space between the first adjustable plate the weighted members' rotation circumference helps control the resulting particle size of the comminuted glass. Controlling the shaft rotation speed also affects the resulting particle size of the comminuted glass. The glass particles roll against each other and against the adjustable plate within the first glass suspension chamber. As the glass particles become sufficiently small, they pass through the space between the first adjustable plate and the rotation circumference either to an optional second glass suspension chamber or to the bottom portion of the housing for collection and removal.

An optional second glass suspension chamber is defined by a second adjustable plate, the first adjustable plate and the rotation circumference. The second adjustable plate can be adjusted to control the space between it and the rotation circumference. Glass particles smaller than the space drop to the bottom portion of the housing for collection and removal.

DESCRIPTION OF THE INVENTION

Figure 1:
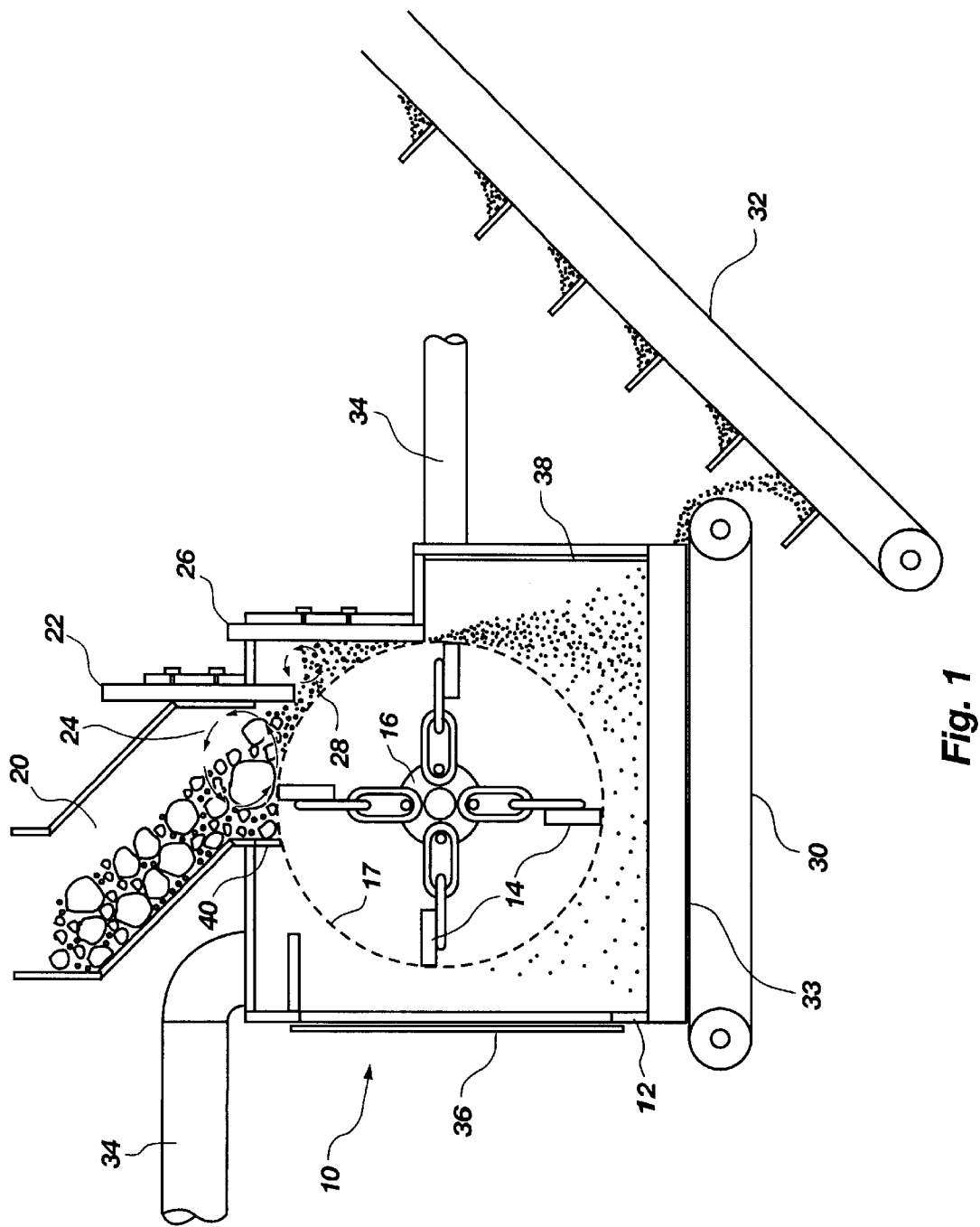
FIG. 1 is a cross-sectional side view of an apparatus for comminuting glass within the scope of the present invention.

The present invention is directed to an apparatus for comminuting glass to produce glass particles having non-uniform, rounded edges. A cross-sectional side view of one currently preferred embodiment is shown in FIG. 1. The glass comminuting apparatus 10 includes a housing 12 within which a plurality of hammers or weighted members 14 rotate. The weighted members 14 are flexibly connected to a rotatable shaft 16 which extends within the housing 12. The weighted members are preferably evenly spaced around the shaft and attached to the shaft by chain links. A motor 18 (shown in FIG. 2) is connected to the shaft 16 to rotate the shaft. When the shaft 16 rotates, the weighted members 14 define a rotation circumference 17, shown as a dashed line in FIG. 1.

Figure 2:
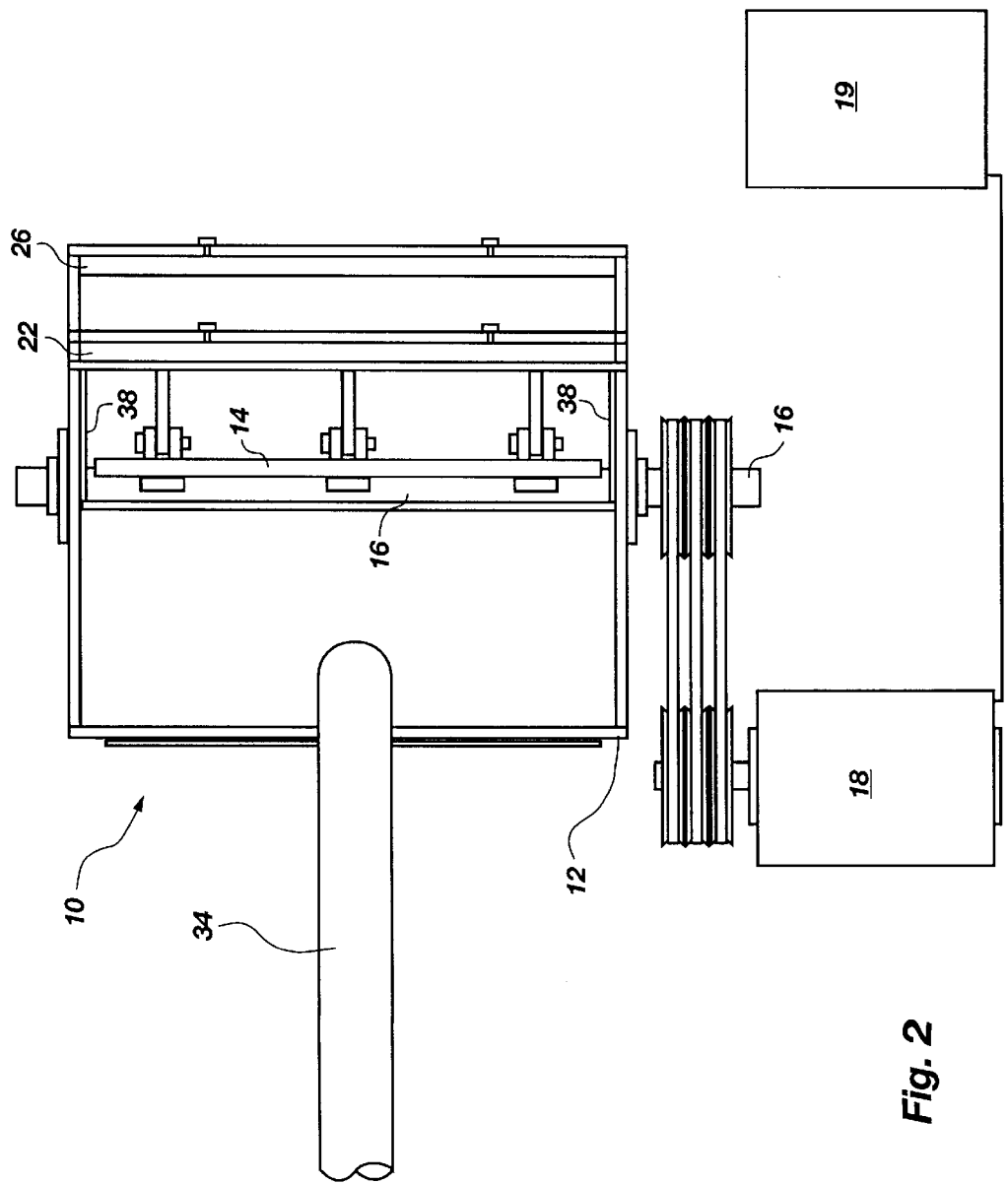
FIG. 2 is a cross-sectional top view the apparatus shown in FIG. 1.

A variable speed controller 19 is preferably provided to vary the speed of motor 18. Although the motor 18 illustrated in FIG. 2 is preferably a 10 hp, variable speed motor, one skilled in the art will appreciate that the required motor power or speed variation will vary depending on the size and capacity of the glass comminuting apparatus 10.

A glass intake opening 20 is located in the top portion of the housing 12 to allow waste glass fibers and carrier material to be introduced into the comminuting apparatus 10. A first adjustable plate 22 is located adjacent the glass intake opening 20. The area between the glass intake opening 20, the rotating hammers, and the plate 22 defines a first glass suspension chamber 24. As illustrated in the Figures, the rapid clockwise motion of the rotating hammers causes glass fibers and carrier material within the first glass suspension chamber 24 to be suspended and to move in a counter clockwise motion, as shown by the arrows. This rolling action rounds any sharp edges of the carrier material and glass fibers and simultaneously reduces the mean particle size of the glass particulates.

A second adjustable plate 26 is optionally located adjacent the first plate 22. The area between the first plate 22, the second plate 26, and the rotating hammers 14 defines a second glass suspension chamber 28. Comminuted glass particles which have been reduced in size are able to pass through the gap between the first plate 22 and the rotating hammers 14 into the second suspension chamber 28 where the glass undergoes further size reduction and rounding by a counter clockwise motion shown by arrows.

Comminuted glass particles pass from the second suspension chamber 28 to the bottom of the housing 12, where a shuttle conveyor 30 transports the comminuted glass to a bucketed conveyor system 32 for transport of the comminuted glass to storage or further processing. A dust skirt 33, preferably made of a flexible rubber material, is located between the housing 12 and the conveyor 30 to inhibit dust from being released from the apparatus 10.

Figure 3:
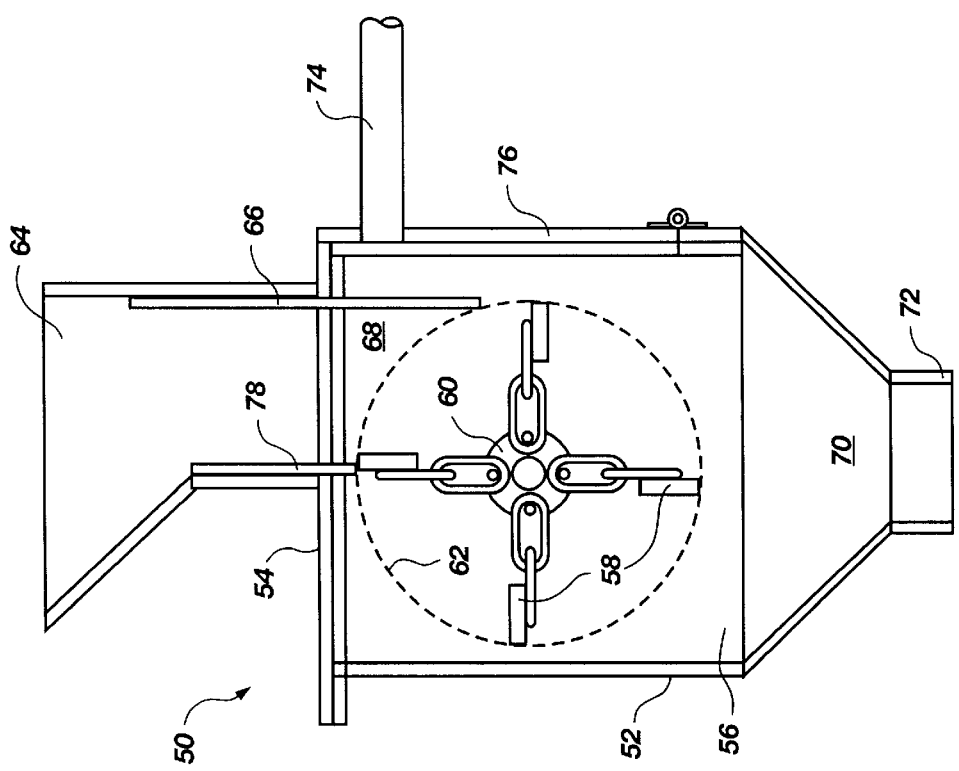
FIG. 3 is a cross-sectional side view of another apparatus for comminuting glass within the scope of the present invention.

It will be appreciated by those having skill in the art that various means can be used for collecting and removing comminuted glass from the apparatus. For instance, Figure shows the shuttle conveyor 30 for conveying the comminuted glass from the apparatus 10. FIG. 3 shows a simple funnel collection apparatus which can be used to collect and remove comminuted glass from the apparatus.

The apparatus preferably includes one or more dust collectors 34 for removal of dust produced during operation of the apparatus. The dust collectors operate under a slight vacuum to withdraw dust generated while the glass is comminuted. The apparatus preferably includes a rear service and inspection plate 36 for access and repair to the interior of the housing 12. The interior surfaces which are exposed to wear preferably include wear plates 38 which can be replaced as needed.

A spring-loaded reflector plate 40 forms a rear surface of the first suspension chamber 24. The reflector plate 40 is biased shut to keep the glass within the first suspension chamber 24. But large, non-breakable materials, such as metal, pass through the biased reflector plate 40 and drop to the bottom of the apparatus. It has been found that when using the reflector plate 40, approximately 98% of the glass is adequately ground. Without the reflector plate, approximately 65% of the glass is adequately ground, while 35% of the glass requires regrinding.

As used herein, the term "glass" encompasses all inorganic products which have cooled to a rigid solid without undergoing crystallization. The term "glass" is also intended to include other glassy materials including ceramic materials such as porcelain and tile. The comminuted glass prepared using the apparatus and method of the present invention will typically have a particle size in the range from about 20 mesh to about 600 mesh. Even smaller sizes, such as 800 to 1000 mesh, are possible. As used herein, comminuted glass is intended to include ground glass having rounded edges, regardless of the origin of the glass. The term comminuted glass includes glass fibers which have been reduced in size. Comminuted glass particles, such as cullet, have striations or grooves on particle surfaces thereof. The striations have been found to be useful when the glass is used as a filler in molded plastic parts.

In operation, the plurality of hammers or weighted members 14 rotate at sufficient velocity to prevent the glass fibers and carrier material from passing directly through to the bottom of the apparatus. Glass is kept within the first suspension chamber 24 by the rotating hammers 14 and by the first adjustable plate 22. The velocity of the hammers 14 causes the glass to spin in a motion opposite the direction of the rotating hammers. That is, if the hammers 14 rotate in a clockwise direction, the glass rotates in a counter-clockwise motion within the first suspension chamber 24 as shown by the arrows in FIG. 1.

The plate 22 can be adjusted up or down to control the space between the plate 22 and the rotation circumference 17 of the hammers 14. This space helps control the comminuted glass particle size. If the plate 22 is positioned close to the rotating hammers 14, the glass is reduced to a smaller particle size than if the plate is positioned farther from the rotating hammers. As described above, a second adjustable plate 26 and second suspension chamber 28 further reduces the glass to a desired particle size. The glass particles are caused to spin and rotate within the second suspension chamber 28 in a manner similar to the first suspension chamber 24.

The hammers 14 rotate sufficiently fast to keep the glass suspended within the first and second suspension chambers 24, 28. As the glass particles become small enough, they pass by the second plate and are collected and removed from the apparatus. This action is referred to as "suspended attrition."

The glass comminuting apparatus 10 illustrated in FIGS. 1 and 2 normally operates at a speed in the range of about 1700 R.P.M. to 2700 R.P.M. with a hammer 14 radius of about 9 inches. At this speed one can obtain the best variety of particles sizes ranging from powder 200 mesh and smaller up to pieces ¼" in size. However if larger particle sizes are desired this can be achieved by slowing the R.P.M. of the rotating hammers from 2700 R.P.M. to as low as 1700 R.P.M. This allows the glass material to fall in between the hammers 14 further and allows the discharge of larger sizes or pieces. Thus, adjusting the rotating hammer speed also helps control the resulting particle size.

One skilled in the art will appreciate that the optimum speed will vary depending on the number of hammers and the diameter of the rotating hammers. For instance, an apparatus having four hammers does not need to spin as fast as an apparatus having two hammers. Likewise, an apparatus having a 10 inch hammer radius must spin faster than an apparatus having a 15 inch hammer radius.

There are other adjustments that can be made to change the size of glass particles being discharged from the apparatus for comminuting glass. The two adjustable plates 22, 26 can be raised from a ¼" clearance to a 1½" clearance to control the particle size.

For instance to retrieve more 20 mesh particles the first plate 22 should be lowered to ½" clearance and the second plate 26 to ¼" clearance. This will give the operator more particles in the 20 mesh range. The plates should be raised for larger particles and lowered for smaller particles.

The deflector plate 40 provides an important safety feature in the event that some ungrindable material is inadvertently dropped into the apparatus. For example, when a particle like steel bolts were to fall into the glass comminuting apparatus, the hammers 14 (being flexibly connected to the rotating shaft) are drawn back by the impact allowing hard material like steel bolts to pass through the hammers and drop out the bottom.

Figure 4:
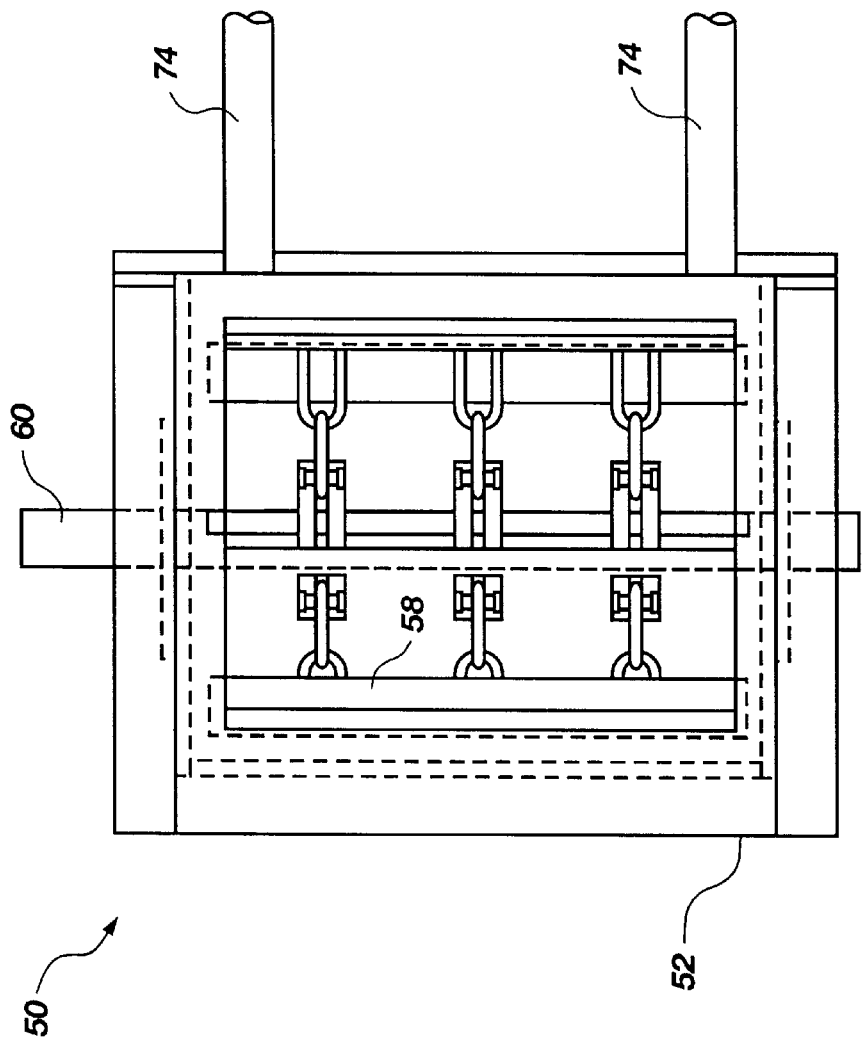
FIG. 4 is a cross-sectional top view the apparatus shown in FIG. 3.

FIGS. 3 and 4 illustrate another apparatus for comminuting glass within the scope of the present invention, designated generally as 50. The embodiment shown in FIGS. 3 and 4 is similar to that shown in FIGS. 1 and 2, except that only one adjustable grinding plate is used and the glass intake opening is shifted slightly. The glass comminuting apparatus 50 includes a housing 52 having a top portion 54 and a bottom portion 56. The housing 52 is configured to house a plurality of hammers or weighted members 58 flexibly connected to a rotatable shaft 60 which extends within the housing 12. The weighted members are preferably evenly spaced around the shaft 60. A drive member (not shown in FIGS. 3 or 4), such as a variable speed motor, can be used to rotate the shaft 60. When the shaft 60 rotates, the weighted members 58 define a rotation circumference 62, shown as a dashed line in FIG. 3.

A glass intake opening 64 is located in the top portion 54 of the housing 52 to allow waste glass fibers and carrier material to be introduced into the comminuting apparatus 50. An adjustable plate 66 is located adjacent the glass intake opening 64. The adjustable plate 66 is preferably adjusted up or down to control the space between said adjustable plate 66 and the rotation circumference 62. The area between the glass intake opening 64, the rotation circumference 62, and the plate 22 defines a glass suspension chamber 68. The rapid rotation of weighted members 58 causes glass within the glass suspension chamber 68 to be suspended and rolled against each other and against the adjustable plate 66. This rolling action rounds any sharp edges of the glass fibers and carrier material, and it simultaneously reduces the mean particle size of the glass particulates.

Comminuted glass particles which have been reduced in size are able to pass through the space between the plate 66 and the rotating hammers 58 to the bottom portion 56 of the housing 52 into a collection funnel 70. The collection funnel 70 has an exit opening 72 to allow removal of the comminuted glass for storage or further processing.

The apparatus 50 preferably includes one or more dust collectors 74 for removal of dust produced during operation of the apparatus. The dust collectors operate under a slight vacuum to withdraw dust generated while the glass is comminuted. The apparatus preferably includes an inspection plate 76 for access and repair to the interior of the housing 52.

A reflector plate 78 is preferably provided to form a rear surface of the suspension chamber 68. The reflector plate 78 keeps the glass within the suspension chamber 68.

Apparatus 50 operates in substantially the same manner as apparatus 10 to produce comminuted glass particles useful for a variety of applications. The apparatus for comminuting glass within the scope of the present invention are capable of efficiently recycling large quantities of waste glass into a form which could be safely handled. The apparatus within the scope of the present invention is also capable of free from contaminants such as grinding compounds.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. An apparatus for comminuting glass fiber comprising:
   a housing having a top portion, a bottom portion, and side walls;
   a plurality of weighted members flexibly connected to and spaced about a rotatable shaft, wherein the weighted members, when rotated about said shaft, define a rotation circumference;
   a drive member for rotating the shaft;
   a glass fiber and carrier material intake opening located at the top portion of the housing;
   a first adjustable plate located adjacent the glass intake opening and positioned such that there is a space between said first adjustable plate and the weighted members' rotation circumference, wherein said space is adjustable; and
   a first glass suspension chamber comprising the region defined by the glass intake opening, the first adjustable plate, and the rotation circumference of the weighted members, wherein said suspension chamber, in combination with rotating weighted members, is configured to suspend glass within said suspension chamber until the glass becomes small enough to pass through the space between said first adjustable plate and the rotation circumference.

2. An apparatus for comminuting glass as defined in claim 1, wherein the carrier material comprises glass powder.

3. An apparatus for comminuting glass as defined in claim 1, wherein the carrier material comprises glass cullet.

4. An apparatus for comminuting glass as defined in claim 1, wherein the intake opening is configured to introduce glass fiber and carrier material at a ratio of at least 1:40, carrier material to fiber, by weight.

5. An apparatus for comminuting glass as defined in claim 1, further comprising means for collecting and removing comminuted glass from the apparatus.

6. An apparatus for comminuting glass as defined in claim 1, further comprising one or more dust collectors for withdrawal of glass dust produced during operation of the apparatus.

7. An apparatus for comminuting glass as defined in claim 1, further comprising a reflector plate defining a rear surface of the first suspension chamber.

8. An apparatus for comminuting glass as defined in claim 7, wherein the reflector plate is spring biased.

9. An apparatus for comminuting glass as defined in claim 1, wherein the plurality of weighted members are flexibly connected to the shaft by chain links.

10. An apparatus for comminuting glass as defined in claim 1, wherein the drive member is a variable speed motor.

11. An apparatus for comminuting glass as defined in claim 1, wherein the housing further comprises a removable access door to permit maintenance of the apparatus.

12. An apparatus for comminuting glass as defined in claim 1, further comprising:
   a second adjustable plate located adjacent the first adjustable plate and positioned such that there is a space between said second adjustable plate and the weighted members' rotation circumference, wherein said space is adjustable; and
   a second glass suspension chamber comprising the region defined by the first adjustable plate, the second adjustable plate, and the rotation circumference of the weighted members.

13. An apparatus for comminuting glass as defined in claim 1, wherein the housing comprises an interior surface and wherein the housing further comprises replaceable wear plates located on at least a portion of said interior surface.

14. A method for comminuting glass fibers comprising:
   (a) introducing a quantity of glass fibers and carrier material into an apparatus for comminuting glass comprising:
      a housing having a top portion, a bottom portion, and side walls;
      a plurality of weighted members flexibly connected to and spaced about a rotatable shaft, wherein the weighted members, when rotated about said shaft, define a rotation circumference; a drive member for rotating the shaft;
      a glass intake opening located at the top portion of the housing;
      a first adjustable plate located adjacent the glass intake opening and positioned such that there is a space between said first adjustable plate and the weighted members' rotation circumference, wherein said space is adjustable; and
      a first glass suspension chamber comprising the region defined by the glass intake opening, the first adjustable plate, and the rotation circumference of the weighted members;
   (b) rotating the shaft to cause the weighted members to rapidly spin and contact the quantity of glass, causing the glass fibers and carrier material to strike the first adjustable plate and be suspended within the first glass suspension chamber until the glass becomes small enough to pass through the space between said first adjustable plate and the rotation circumference; and
   (c) adjusting the space between the first adjustable plate and the weighted members' rotation circumference.

15. A method for comminuting glass fibers as defined in claim 14, wherein the ratio of carrier material to glass fiber introduced into the apparatus is at least 1:40, by weight.

16. A method for comminuting glass fibers as defined in claim 14, wherein the carrier material is selected from glass powder and glass cullet.

17. A method for comminuting glass fibers as defined in claim 14, further comprising the step of collecting and removing comminuted glass fibers from the apparatus.

18. A method for comminuting glass fibers as defined in claim 14, wherein the method produces comminuted glass having a size in the range from 20 mesh to about 600 mesh.

19. A method for comminuting glass fibers as defined in claim 14, further comprising the step of removing glass dust produced during operation of the apparatus through a dust collector.

20. A method for comminuting glass fibers as defined in claim 14, further comprising the step of controlling the shaft rotation speed.

* * * * *